(12) United States Patent
Togashi

(10) Patent No.: US 8,068,330 B2
(45) Date of Patent: Nov. 29, 2011

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 368 days.

(21) Appl. No.: 12/500,148

(22) Filed: Jul. 9, 2009

(65) Prior Publication Data

US 2010/0033896 A1  Feb. 11, 2010

(30) Foreign Application Priority Data

Aug. 11, 2008  (JP) ................................. 2008-207044

(51) Int. Cl.
*H01G 4/228* (2006.01)

(52) U.S. Cl. ............... 361/306.3; 361/321.1; 361/321.2; 361/306.1; 361/311; 361/313

(58) Field of Classification Search ............... 361/306.3, 361/306.1, 303–305, 309, 311–313, 308.1, 361/321.1, 321.2, 328, 330; 333/181–185
See application file for complete search history.

(56) References Cited

U.S. PATENT DOCUMENTS

| | | | | |
|---|---|---|---|---|
| 6,144,547 A | * | 11/2000 | Retseptor | 361/303 |
| 6,515,842 B1 | * | 2/2003 | Hayworth et al. | 361/303 |
| 6,587,327 B1 | * | 7/2003 | Devoe et al. | 361/306.3 |
| 6,850,404 B2 | * | 2/2005 | Engel et al. | 361/301.4 |
| 7,092,236 B2 | * | 8/2006 | Lee et al. | 361/311 |
| 7,161,446 B2 | * | 1/2007 | Uchida et al. | 333/185 |
| 7,432,784 B2 | | 10/2008 | Togashi | |
| 7,599,166 B2 | | 10/2009 | Lee et al. | |
| 2008/0291600 A1 | * | 11/2008 | Takashima et al. | 361/306.1 |

FOREIGN PATENT DOCUMENTS

| | | |
|---|---|---|
| JP | A-2006-059977 | 3/2006 |
| JP | A-2007-142414 | 6/2007 |
| JP | A-2007-221472 | 8/2007 |

* cited by examiner

*Primary Examiner* — Nguyen T Ha
(74) *Attorney, Agent, or Firm* — Oliff & Berridge, PLC

(57) ABSTRACT

A multilayer capacitor comprises a capacitor element body; a first signal terminal electrode, a second signal terminal electrode, and a ground terminal electrode which are arranged on an outer surface of the capacitor element body; and a ground internal electrode and first to third signal internal electrodes which are arranged within the capacitor element body. The ground internal electrode is connected to the ground terminal electrode. The first signal internal electrode is connected to the first signal terminal electrode and opposes the ground internal electrode so as to construct a first capacitor. The second signal internal electrode is connected to the first signal terminal electrode and opposes the ground internal electrode so as to construct a second capacitor. The third signal internal electrode is connected to the second signal terminal electrode and opposes the ground internal electrode so as to construct a third capacitor. The first and second capacitors have respective capacitances different from each other.

7 Claims, 12 Drawing Sheets

MULTILAYER CAPACITOR

BACKGROUND OF THE INVENTION

1. Field of the Invention

The present invention relates to a multilayer capacitor.

2. Related Background Art

A multilayer capacitor as a measure against noise in a two-line signal path is disclosed in Japanese Patent Application Laid-Open No. 2006-59977. The multilayer capacitor disclosed in Japanese Patent Application Laid-Open No. 2006-59977 comprises a first signal line terminal connected to a first signal line, a second signal line terminal connected to a second signal line, and first and second ground terminals connected to grounding pads, while a first capacitor is constructed between the first signal line terminal and first ground terminal, and a second capacitor is constructed between the second signal line terminal and second ground terminal.

SUMMARY OF THE INVENTION

As antinoise multilayer capacitors, those exhibiting low impedance in a further wider bandwidth have been in demand. It is therefore an object of the present invention to provide a multilayer capacitor in which a bandwidth yielding low impedance is made further wider.

The present invention provides a multilayer capacitor comprising a capacitor element body; a first signal terminal electrode, a second signal terminal electrode, and a ground terminal electrode which are arranged on an outer surface of the capacitor element body; and a ground internal electrode and first to third signal internal electrodes which are arranged within the capacitor element body; wherein the ground internal electrode is connected to the ground terminal electrode; wherein the first signal internal electrode is connected to the first signal terminal electrode and opposes the ground internal electrode so as to construct a first capacitor; wherein the second signal internal electrode is connected to the first signal terminal electrode and opposes the ground internal electrode so as to construct a second capacitor; wherein the third signal internal electrode is connected to the second signal terminal electrode and opposes the ground internal electrode so as to construct a third capacitor; and wherein the first and second capacitors have respective capacitances different from each other.

In the multilayer capacitor of the present invention, the first to third capacitors are constructed by the ground internal electrode and the first to third signal internal electrodes. The first and second capacitors are connected in parallel between the first signal terminal electrode and ground terminal electrode. The first and second capacitors connected in parallel are connected in series to the third capacitor between the first and second signal terminal electrodes. Therefore, when the multilayer capacitor of the present invention is mounted such that the ground terminal electrode is connected to the ground while the first and second signal terminal electrodes are connected to two signal lines, respectively, the first to third capacitors are connected between the ground and the two transmission lines. Since the first and second capacitors have respective capacitances different from each other, the bandwidth yielding low impedance becomes further wider.

Preferably, the multilayer capacitor further comprises a fourth signal internal electrode arranged within the capacitor element body, the fourth signal internal electrode is connected to the second signal terminal electrode and opposes the ground internal electrode so as to construct a fourth capacitor, and the third and fourth capacitors have respective capacitances different from each other.

In this case, the ground internal electrode and the first to fourth signal internal electrodes construct the first to fourth capacitors. The third and fourth capacitors are connected in parallel between the second signal terminal electrode and ground terminal electrode. The third and fourth capacitors connected in parallel are connected in series to the first and second capacitors between the first and second signal terminal electrodes. Since the third and fourth capacitors have respective capacitances different from each other, the bandwidth yielding low impedance becomes further wider. Since the first and second capacitors are connected between the first signal terminal electrode and ground terminal electrode, while the third and fourth capacitors are connected between the second signal terminal electrode and ground terminal electrode, symmetry can be improved.

Preferably, the first to fourth signal internal electrodes are arranged on the same layer, the first and second signal internal electrodes have respective areas different from each other, and the third and fourth signal internal electrodes have respective areas different from each other This can easily make the respective capacitances of the first and second capacitors different from each other, and the respective capacitances of the third and fourth capacitors different from each other. Arranging the first to fourth signal internal electrodes on the same layer can inhibit the number of laminated layers in the multilayer capacitor from increasing, so as to make the multilayer capacitor smaller.

Preferably, the ground terminal electrode includes first and second ground terminal electrodes arranged separately from each other, the ground internal electrode includes first and second ground internal electrodes arranged separately from each other, the first ground internal electrode is connected to the first ground terminal electrode and has a region opposing the first signal internal electrode but no region opposing the second signal internal electrode, and the second ground internal electrode is connected to the second ground terminal electrode and has a region opposing the second signal internal electrode but no region opposing the first signal internal electrode.

In this case, the first ground internal electrode and the first signal internal electrode construct the first capacitor, while the second ground internal electrode and the second signal internal electrode construct the second capacitor. The first ground internal electrode has no region opposing the second signal internal electrode, while second ground internal electrode has no region opposing the first signal internal electrode. As a consequence, crosstalk can be inhibited from occurring between the first and second capacitors.

Preferably, the first ground internal electrode includes first and second electrode parts arranged separately from each other, the first electrode part of the first ground internal electrode is connected to the first ground terminal electrode and has a region opposing the first signal internal electrode, and the second electrode part of the first ground internal electrode is connected to the first ground terminal electrode and has a region opposing the third signal internal electrode.

In this case, the first electrode part of the first ground internal electrode and the first signal internal electrode construct the first capacitor, while the second electrode part of the first ground internal electrode and the third signal internal electrode construct the third capacitor. This can inhibit crosstalk from occurring between the first and third capacitors as compared with the case where the first and third capacitors are constructed such as to share the first ground internal electrode._

Preferably, the first electrode part of the first ground internal electrode has no region opposing the third signal internal electrode, while the second electrode part of the first ground internal electrode has no region opposing the first signal internal electrode.

In this case, the first electrode part of the first ground internal electrode constituting the first capacitor has no region opposing the third signal internal electrode constituting the third capacitor, while the second electrode part of the first ground internal electrode constituting the third capacitor has no region opposing the first signal internal electrode constituting the first capacitor. This can inhibit crosstalk from occurring between the first and third capacitors.

Preferably, the capacitor element body is formed like a substantially rectangular parallelepiped and has first and second side faces opposing each other and extending transversely of the capacitor element body and third and fourth side faces opposing each other and extending longitudinally of the capacitor element body as the outer surface, the first signal terminal electrode is arranged on the first side face, the second signal terminal electrode is arranged on the second side face, the first ground terminal electrode is arranged on the third side face, and the second ground terminal electrode is arranged on the fourth side face.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained with reference to the accompanying drawings. In the explanation, the same constituents or those having the same functions will be referred to with the same signs while omitting their overlapping descriptions.

First Embodiment

Figure 1:
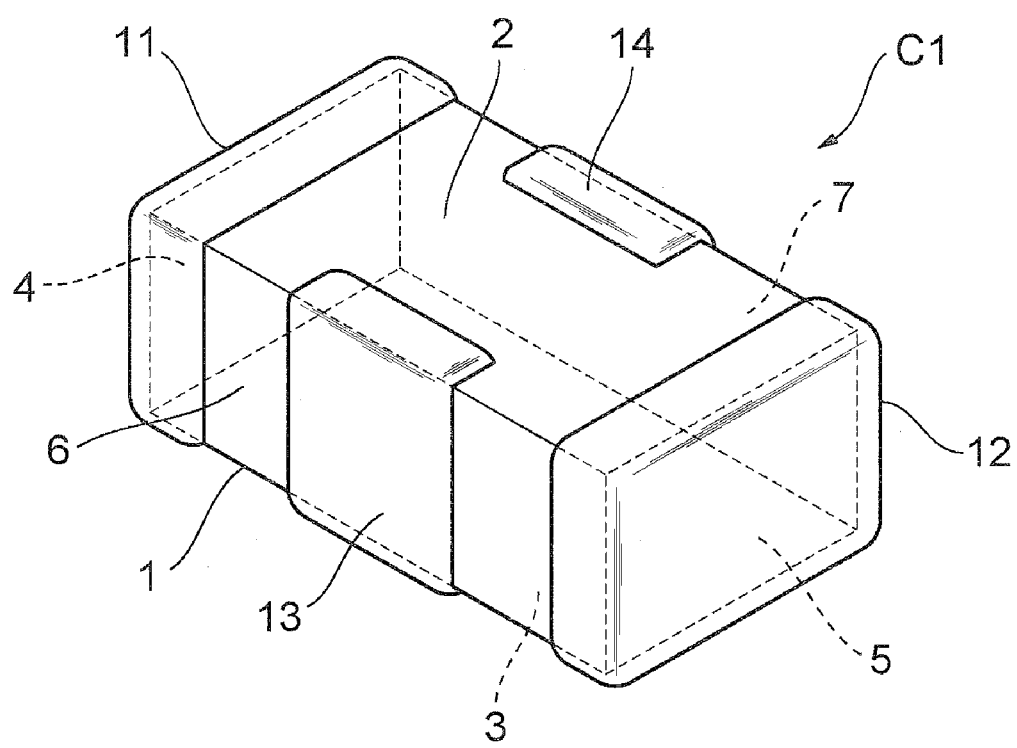
FIG. 1 is a perspective view of the multilayer capacitor in accordance with a first embodiment.
Figure 2:
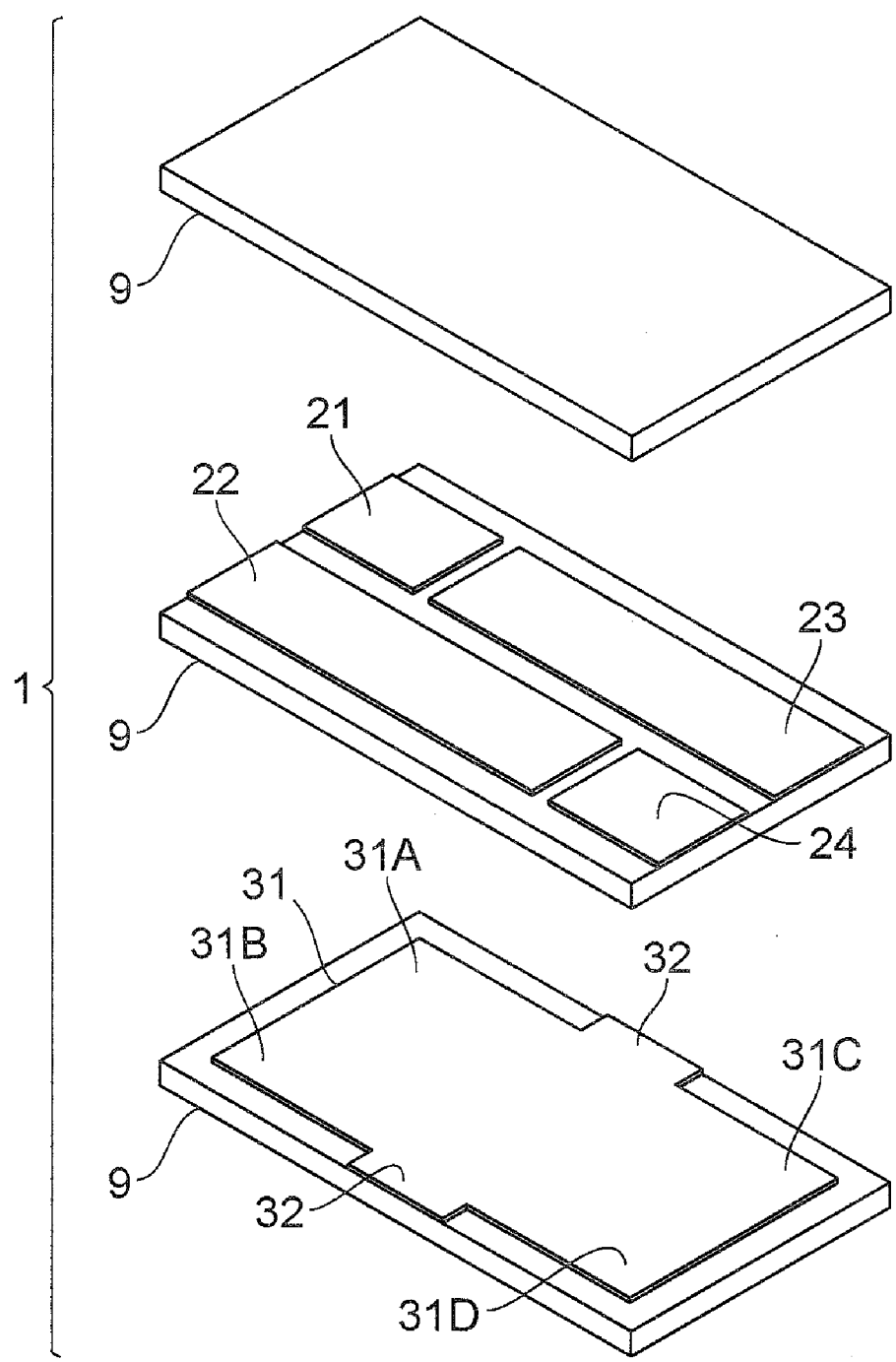
FIG. 2 is an exploded perspective view of a capacitor element body included in the multilayer capacitor in accordance with the first embodiment.
Figure 3A:
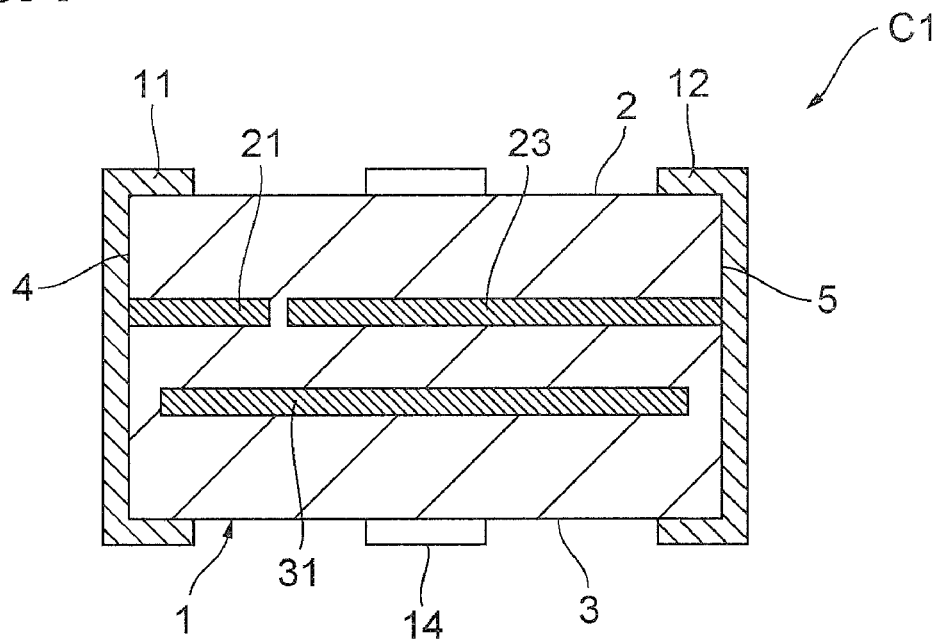
FIGS. 3A and 3B are views illustrating a cross-sectional structure of the multilayer capacitor in accordance with the first embodiment.
Figure 3B:
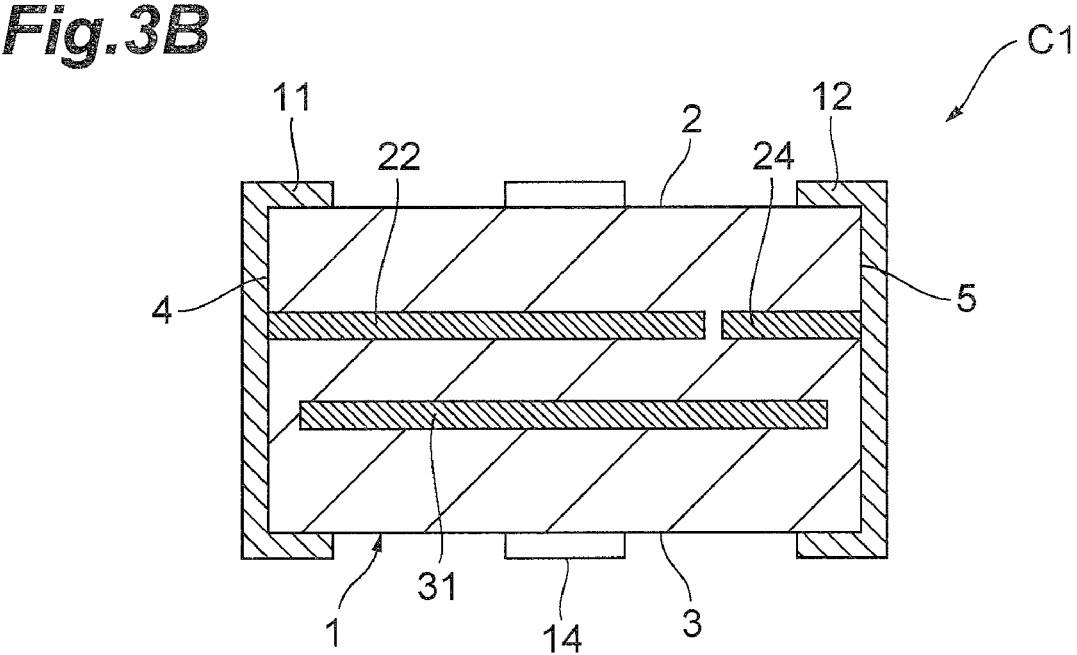
Figure 4:
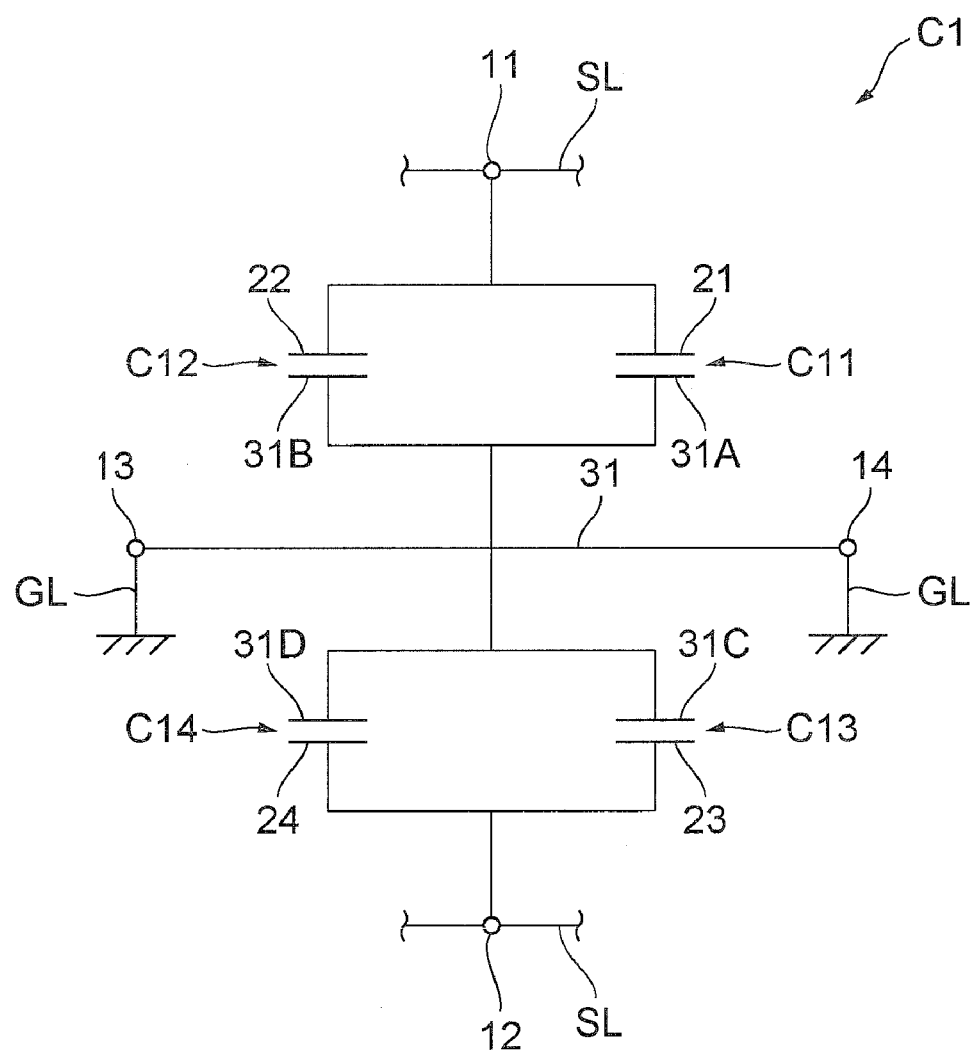
FIG. 4 is an equivalent circuit diagram of the multilayer capacitor in accordance with the first embodiment.

With reference to FIGS. 1 to 4, the structure of a multilayer capacitor C1 in accordance with the first embodiment will be explained. FIG. 1 is a perspective view illustrating the multilayer capacitor in accordance with the first embodiment. FIG. 2 is an exploded perspective view of a capacitor element body included in the multilayer capacitor in accordance with the first embodiment. FIGS. 3A and 3B are views illustrating a cross-sectional structure of the multilayer capacitor in accordance with the first embodiment. FIG. 4 is an equivalent circuit diagram of the multilayer capacitor in accordance with the first embodiment.

As illustrated in FIG. 1, the multilayer capacitor C1 includes a capacitor element body 1 formed like a substantially rectangular parallelepiped. The capacitor element body 1 has rectangular first and second main faces 2, 3 opposing each other, first and second side faces 4, 5 opposing each other and extending transversely of the capacitor element body 1 (in the shorter side direction of the main faces 2, 3), and third and fourth side faces 6, 7 opposing each other and extending longitudinally of the capacitor element body 1 (in the longer side direction of the main faces 2, 3).

The multilayer capacitor C1 comprises a first signal terminal electrode 11, a second signal terminal electrode 12, a first ground terminal electrode 13, and a second ground terminal electrode 14 which are arranged separately from each other on outer surfaces of the capacitor element body 1.

The first signal terminal electrode 11 is arranged on the first side face 4 of the capacitor element body 1. The first signal terminal electrode 11 is formed such as to cover the whole first side face 4 and end portions (closer to the first side face 4) of the first and second main faces 2, 3 and third and fourth side faces 6, 7. The second signal terminal electrode 12 is arranged on the second side face 5 of the capacitor element body 1. The second signal terminal electrode 12 is formed such as to cover the whole second side face 5 and end portions (closer to the first side face 4) of the first and second main faces 2, 3 and third and fourth side faces 6, 7.

The first ground terminal electrode 13 is arranged on the third side face 6 of the capacitor element body 1. The first ground terminal electrode 13 is formed such as to cover substantially the center portion of the third side face 6 in the opposing direction of the first and second side faces 4, 5 and a portion of the first and second main faces 2, 3. The second ground terminal electrode 14 is arranged on the fourth side face 7 of the capacitor element body 1. The second ground terminal electrode 14 is formed such as to cover substantially the center portion of the fourth side face 7 in the opposing direction of the first and second side faces 4, 5 and a portion of the first and second main faces 2, 3. The first and second ground terminal electrodes 13, 14 oppose each other in the opposing direction of the third and fourth side faces 6, 7.

The first and second signal terminal electrodes 11, 12 and first and second ground terminal electrodes 13, 14 are formed by applying and sintering a conductive paste containing a conductive metal powder and glass frit onto their corresponding outer surfaces of the capacitor element body 1, for example. Plating layers may be formed on the sintered first and second signal terminal electrodes 11, 12 and first and second ground terminal electrodes 13, 14 when necessary.

As illustrated in FIG. 2, the capacitor element body 1 comprises a plurality of dielectric layers 9. The capacitor element body 1 is constructed by laminating a plurality of dielectric layers 9 in the opposing direction of the first and second main faces 2, 3. Each dielectric layer 9 is constituted by a sintered body of a ceramic green sheet containing a dielectric ceramic (based on $BaTiO_3$, $Ba(Ti, Zr)O_3$, $(Ba, Ca)TiO_3$, or the like), for example, and has a property as a dielectric. In the actual multilayer capacitor C1, the dielectric layers 9 are integrated to such an extent that their boundaries are indiscernible.

As illustrated in FIGS. 2, 3A, and 3B, the multilayer capacitor C1 comprises first to fourth signal internal electrodes 21 to 24 and a ground internal electrode 31. FIGS. 3A and 3B illustrate respective cross-sectional structures of the capacitor element body 1 cut along planes parallel to the third and fourth side faces 6, 7. FIG. 3A illustrates the structure in the case where the capacitor element body 1 is cut such that the cross section includes the first and third signal internal electrodes 21, 23, while FIG. 3B illustrates the structure in the case where the capacitor element body 1 is cut such that the cross section includes the second and fourth signal internal electrodes 22, 24.

The first to fourth signal internal electrodes 21 to 24 and ground internal electrode 31 are made of a conductive material (e.g, Ni which is a base metal) typically used for inner electrodes of multilayer electronic components. The first to fourth signal internal electrodes 21 to 24 and ground internal electrode 31 are constituted by sintered bodies of a conductive paste containing the above-mentioned conductive material.

The first to fourth signal internal electrodes 21 to 24 are arranged parallel to the dielectric layers 9 within the capacitor element body 1. The first to fourth signal internal electrodes 21 to 24 are arranged separately from each other on the same layer. The first to fourth signal internal electrodes 21 to 24 are formed like rectangles.

The first signal internal electrode 21 is arranged closer to the first and fourth side faces 4, 7. One side of the first signal internal electrode 21 facing the fourth side face 7 is parallel to and separated from the fourth side face 7. One side of the first signal internal electrode 21 facing the first side face 4 is exposed at the first side face 4. Therefore, the first signal internal electrode 21 is connected physically and electrically to the first signal terminal electrode 11 covering the first side face 4.

The second signal internal electrode 22 is arranged closer to the first and third side faces 4, 6. One side of the second signal internal electrode 22 facing the third side face 6 is parallel to and separated from the third side face 6. One side of the second signal internal electrode 22 facing the first side face 4 is exposed at the first side face 4. Therefore, the second signal internal electrode 22 is connected physically and electrically to the first signal terminal electrode 11 covering the first side face 4.

The third signal internal electrode 23 is arranged closer to the second and fourth side faces 5, 7. One side of the third signal internal electrode 23 facing the fourth side face 7 is parallel to and separated from the fourth side face 7. One side of the third signal internal electrode 23 facing the second side face 5 is exposed at the second side face 5. Therefore, the third signal internal electrode 23 is connected physically and electrically to the second signal terminal electrode 12 covering the second side face 5.

The fourth signal internal electrode 24 is arranged closer to the second and third side faces 5, 6. One side of the fourth signal internal electrode 24 facing the third side face 6 is parallel to and separated from the third side face 6. One side of the fourth signal internal electrode 24 facing the second side face 5 is exposed at the second side face 5. Therefore, the fourth signal internal electrode 24 is connected physically and electrically to the second signal terminal electrode 12 covering the second side face 5.

The first to fourth signal internal electrodes 21 to 24 have about the same length in the opposing direction of the third and fourth side faces 6, 7. The first and third signal internal electrodes 21, 23 are arranged in a row in the opposing direction of the first and second side faces 4, 5. The first signal internal electrode 21 has an area set smaller than that of the third signal internal electrode 23. The area refers to that seen in the laminating direction of the dielectric layers 9 (the opposing direction of the first and second main faces 2, 3).

The second and fourth signal internal electrodes 22, 24 are arranged in a row in the opposing direction of the first and second side faces 4, 5. The second signal internal electrode 22 has an area set greater than that of the fourth signal internal electrode 24. The area of the second signal internal electrode 22 is on a par with that of the third signal internal electrode 23, while the area of the fourth signal internal electrode 24 is on a par with that of the first signal internal electrode 21.

The ground internal electrode 31 is arranged adjacent to the first to fourth signal internal electrodes 21 to 24 through the dielectric layer 9 in the laminating direction. The ground internal electrode 31 has a main electrode portion formed like a rectangle and a pair of lead portions 32. The main electrode portion and lead portions 32 are formed integrally. The four sides constituting the main electrode portion are parallel to and separated from the side faces 4 to 7. The main electrode portion of the ground internal electrode 31 opposes the first to fourth signal internal electrodes 21 to 24 through an insulating layer in the laminating direction.

One lead portion 32 is led from the center portion of one side of the main electrode portion facing the third side face 6 to the third side face 6, so that an end portion of the lead portion 32 is exposed at the third side face 6. The first ground terminal electrode 13 is formed such as to cover the end portion of the lead portion 32 exposed at the third side face 6. As a consequence, the ground internal electrode 31 and the first ground terminal electrode 13 are connected to each other physically and electrically.

The other lead portion 32 is led from the center portion of one side of the main electrode portion facing the fourth side face 7 to the fourth side face 7, so that an end portion of the lead portion 32 is exposed at the fourth side face 7. The second ground terminal electrode 14 is formed such as to cover the end portion of the lead portion 32 exposed at the fourth side face 7. As a consequence, the ground internal electrode 31 and the second ground terminal electrode 14 are connected to each other physically and electrically.

The ground internal electrode 31 (main electrode portion) opposes the first to fourth signal internal electrodes 21 to 24 through the dielectric layer 9 in the laminating direction. A region 31A included in the ground internal electrode 31 overlaps the first signal internal electrode 21 as seen in the laminating direction. The region 31A of the ground internal electrode 31 and the first signal internal electrode 21 construct a first capacitor C11. In the dielectric layer 9, the portion held between the region 31A of the ground internal electrode 31 and the first signal internal electrode 21 is one substantially generating a capacitance component of the first capacitor C11.

A region 31B included in the ground internal electrode 31 overlaps the second signal internal electrode 22 as seen in the laminating direction. The region 31B of the ground internal electrode 31 and the second signal internal electrode 22 construct a second capacitor C12. In the dielectric layer 9, the portion held between the region 31B of the ground internal electrode 31 and the second signal internal electrode 22 is one substantially generating a capacitance component of the second capacitor C12.

The area by which the second signal internal electrode 22 and the region 31B of the ground internal electrode 31 that constitute the second capacitor C12 oppose each other is greater than the area by which the first signal internal electrode 21 and the region 31A of the ground internal electrode 31 that constitute the first capacitor C11 oppose each other. Therefore, the capacitance of the second capacitor C12 is greater than that of the first capacitor C11.

A region 31C included in the ground internal electrode 31 overlaps the third signal internal electrode 23 as seen in the laminating direction. The region 31C of the ground internal electrode 31 and the third signal internal electrode 23 construct a third capacitor C13. In the dielectric layer 9, the portion held between the region 31C of the ground internal electrode 31 and the third signal internal electrode 23 is one substantially generating a capacitance component of the third capacitor C13.

The area by which the third signal internal electrode 23 and the region 31C of the ground internal electrode 31 that constitute the third capacitor C13 oppose each other is greater than the area by which the first signal internal electrode 21 and the region 31A of the ground internal electrode 31 that constitute the first capacitor C11 oppose each other. Therefore, the capacitance of the third capacitor C13 is greater than that of the first capacitor C11.

The area by which the third signal internal electrode 23 and the region 31C of the ground internal electrode 31 that constitute the third capacitor C13 oppose each other is on a par with the area by which the second signal internal electrode 22 and the region 31B of the ground internal electrode 31 that constitute the second capacitor C12 oppose each other. Therefore, the capacitance of the second capacitor C13 is on a par with that of the second capacitor C12.

A region 31D included in the ground internal electrode 31 overlaps the fourth signal internal electrode 24 as seen in the laminating direction. The region 31D of the ground internal electrode 31 and the fourth signal internal electrode 24 construct a fourth capacitor C14. In the dielectric layer 9, the portion held between the region 31D of the ground internal electrode 31 and the fourth signal internal electrode 24 is one substantially generating a capacitance component of the fourth capacitor C14.

The area by which the fourth signal internal electrode 24 and the region 31D of the ground internal electrode 31 that constitute the fourth capacitor C14 oppose each other is smaller than the area by which the third signal internal electrode 23 and the region 31C of the ground internal electrode 31 that constitute the third capacitor C13 oppose each other. Therefore, the capacitance of the fourth capacitor C14 is smaller than that of the third capacitor C13.

The area by which the fourth signal internal electrode 24 and the region 31D of the ground internal electrode 31 that constitute the fourth capacitor C14 oppose each other is on a par with the area by which the first signal internal electrode 21 and the region 31A of the ground internal electrode 31 that constitute the first capacitor C11 oppose each other. Therefore, the capacitance of the fourth capacitor C14 is on a par with that of the first capacitor C11.

In thus constructed multilayer capacitor C1, the first signal terminal electrode 11 and second signal terminal electrodes 12 are insulated from each other. The first and second signal terminal electrodes 11, 12 are insulated from the first and second ground terminal electrode 13, 14.

In the multilayer capacitor C1, as illustrated in FIG. 4, the first and second capacitors C11, C12 having respective capacitances different from each other are connected in parallel between the first signal terminal electrode 11 and the first and second ground terminal electrodes 13, 14. The third and fourth capacitors C13, C14 having respective capacitances different from each other are connected in parallel between the second signal terminal electrode 12 and the first and second ground terminal electrodes 13, 14. A set of the first and second capacitors C11, C12 and a set of the third and fourth capacitors C13, C14 are connected in series between the first and second signal terminal electrodes 11, 12.

The multilayer capacitor C1 is mounted such that the first main face 2 or second main face 3 opposes another component (e.g., a circuit substrate or electronic component). For example, the first and second signal terminal electrodes 11, 12 are connected respectively to two signal transmission lines SL constituting a differential transmission line or the like. The first and second ground terminal electrodes 13, 14 are connected to respective ground lines GL. As a consequence, the multilayer capacitor C1 by itself functions to remove noise from the two signal transmission lines SL. If conduction occurs between the first and second signal terminal electrodes 11, 12 for some reason, the circuit will be short-circuited without attaining the noise removal function of the multilayer capacitor C1.

In this embodiment, as in the foregoing, the first and second capacitors C11, C12 having respective capacitances different from each other are connected in parallel between the first signal terminal electrode 11 and the first and second ground terminal electrodes 13, 14. This widens the bandwidth yielding low impedance. The third and fourth capacitors C13, C14 having respective capacitances different from each other are connected in parallel between the second signal terminal electrode 12 and the first and second ground terminal electrodes 13, 14. This widens the bandwidth yielding low impedance.

This embodiment constructs four, i.e., first to fourth, capacitors C11 to C14, which are two by two connected in parallel between the first signal terminal electrode 11 and the first and second ground terminal electrodes 13, 14 and between the second signal terminal electrode 12 and the first and second ground terminal electrodes 13, 14. This can improve the symmetry with respect to the first and second signal terminal electrodes 11, 12. The combined capacitance of the two capacitors connected between the first signal terminal electrode 11 and the first and second ground terminal electrodes 13, 14 is on a par with the capacitance of the two capacitors connected between the second signal terminal electrode 12 and the first and second ground terminal electrodes 13, 14, whereby the symmetry can further be improved.

This embodiment arranges the first to fourth signal internal electrodes 21 to 24 such that they oppose the ground internal electrode 31 through the dielectric layer 9. Therefore, making the first and second signal internal electrodes 21, 22 with respective areas different from each other easily allows the first and second capacitors C11, C12 to have respective capacitances different from each other. Making the third and fourth signal internal electrodes 23, 24 with respective areas different from each other easily allows the third and fourth capacitors C13, C14 to have respective capacitances different from each other.

This embodiment arranges the first to fourth signal internal electrodes 21 to 24 on the same layer. This reduces the total number of laminations of the inner electrodes and dielectric layers for yielding a desirable capacitance in the first to fourth capacitors C11 to C14, whereby the multilayer capacitor C1 (capacitor element body 1) can attain a lower profile.

This embodiment constructs the first to fourth capacitors C11 to C14 by arranging the first to fourth signal internal electrodes 21 to 24 such that they oppose the ground internal electrode 31 through the dielectric layer 9. Therefore, the first to fourth capacitors C11 to C14 can share the ground internal electrode 31. Hence, the multilayer capacitor C1 can be made smaller.

The ground internal electrode 31 functions to connect each of the first to fourth capacitors C11 to C14 to the first and second ground terminal electrodes 13, 14. Therefore, the multilayer capacitor C1 can be made smaller.

In the following, other embodiments in accordance with the present invention will be explained. The multilayer capacitors in accordance with the following embodiments differ from the multilayer capacitor C1 in accordance with the first embodiment in terms of structures of signal internal electrodes and ground internal electrodes. In the following, structures which are different from those of the multilayer capacitor C1 in accordance with the first embodiment will mainly be explained, while omitting the common structures.

Second Embodiment

Figure 5:
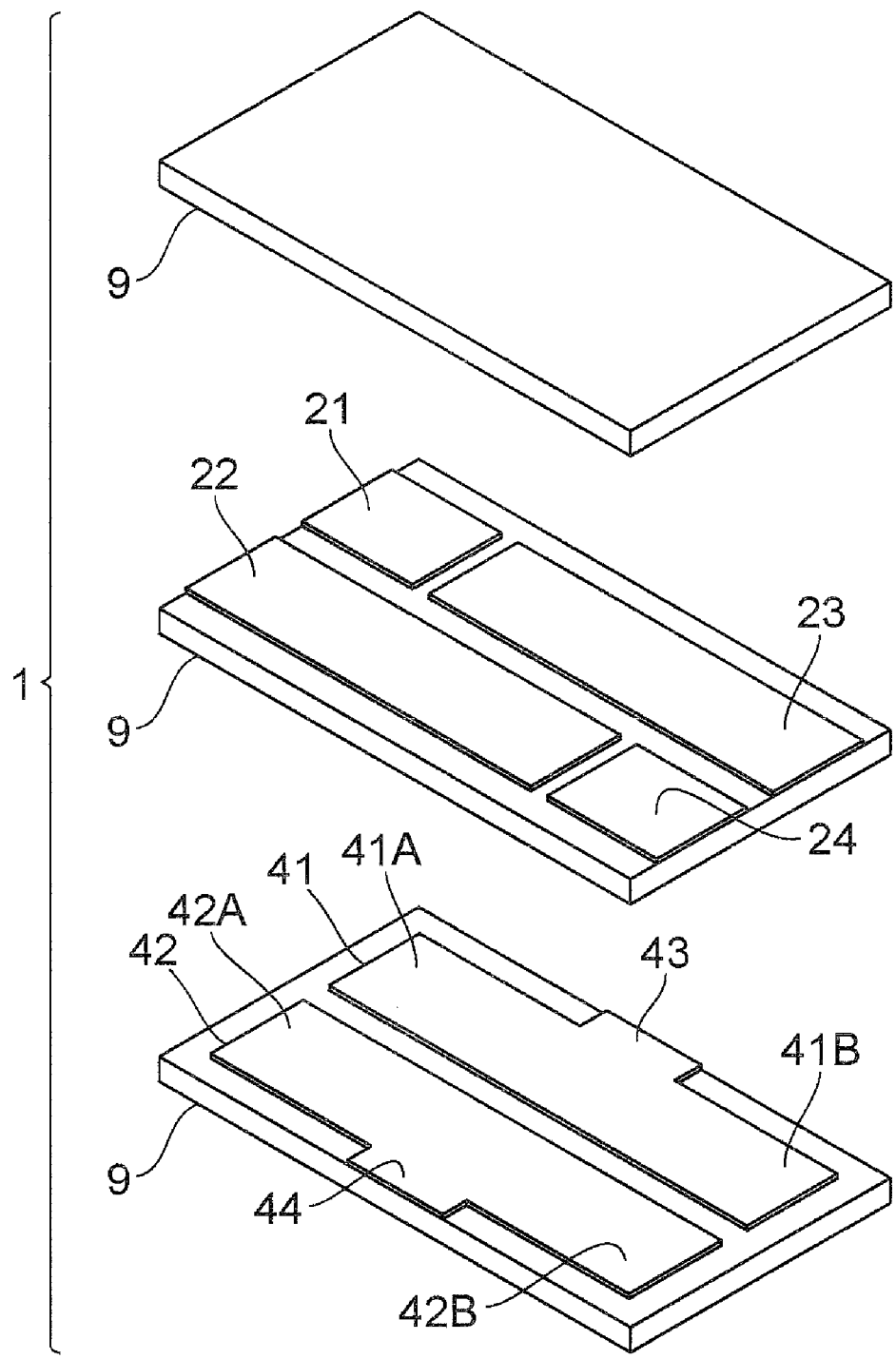
FIG. 5 is an exploded perspective view of a capacitor element body included in the multilayer capacitor in accordance with a second embodiment.
Figure 6:
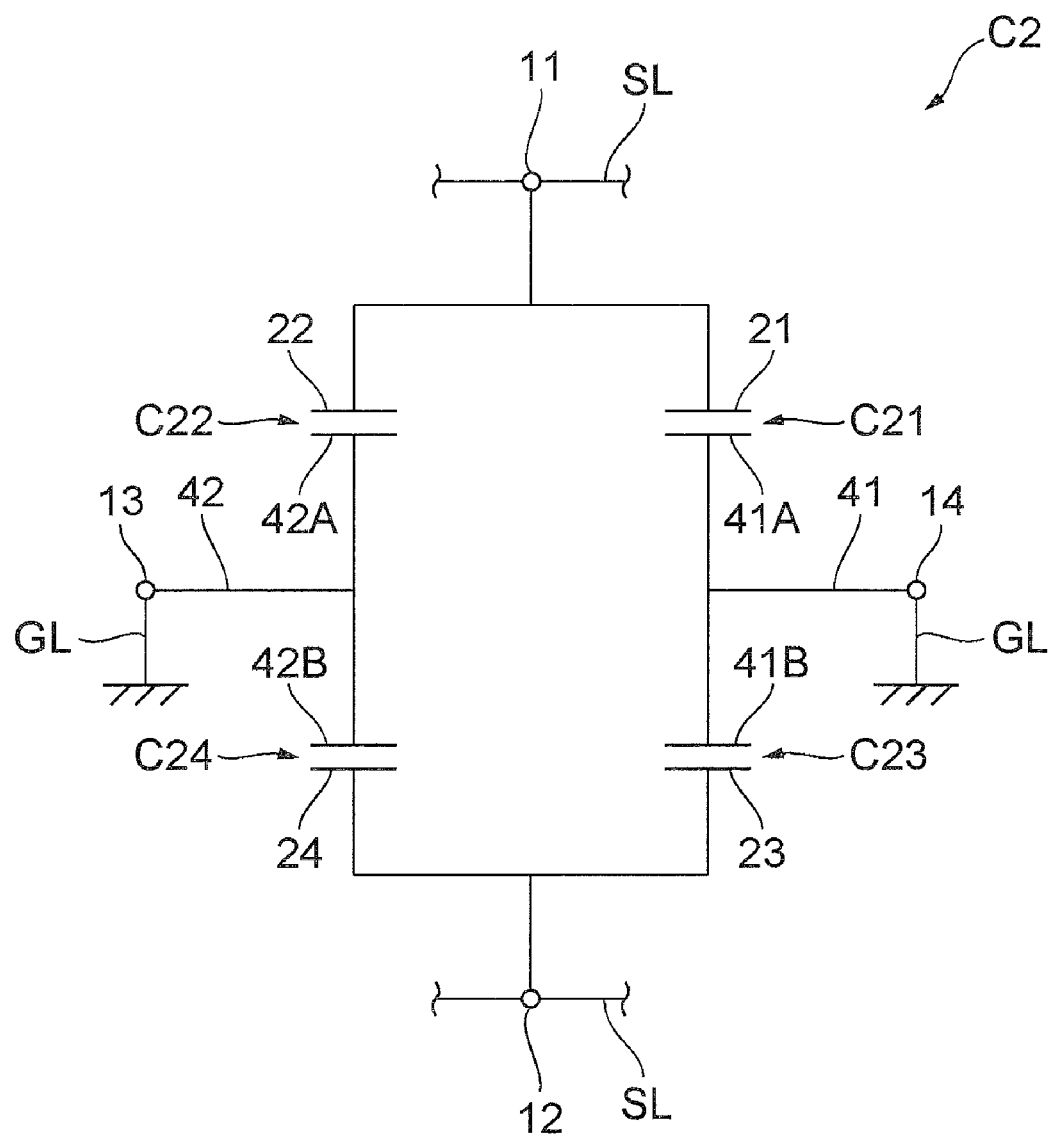
FIG. 6 is an equivalent circuit diagram of the multilayer capacitor in accordance with the second embodiment.

The structure of the multilayer capacitor C2 in accordance with the second embodiment will be explained with reference to FIGS. 5 and 6. FIG. 5 is an exploded perspective view of a capacitor element body included in the multilayer capacitor in accordance with the second embodiment. FIG. 6 is an equivalent circuit diagram of the multilayer capacitor in accordance with the second embodiment.

As illustrated in FIG. 5, the multilayer capacitor C2 in accordance with the second embodiment comprises the first to fourth signal internal electrodes 21 to 24 as in the multilayer capacitor C1 of the above-mentioned first embodiment. The multilayer capacitor C2 in accordance with this embodiment comprises first and second ground internal electrodes 41, 42 instead of the above-mentioned ground internal electrode 31.

The first and second ground internal electrodes 41, 42 are arranged on a layer adjacent through the dielectric layer 9 in the laminating direction to a layer on which the first to fourth signal internal electrodes 21 to 24 are arranged. The first and second ground internal electrodes 41, 42 are separated from each other on the same layer. The first ground internal electrode 41 has a main electrode portion formed like a rectangle and a lead portion 43. The main electrode portion and lead portion 43 are formed integrally. The second ground internal electrode 42 has a main electrode portion formed like a rectangle and a lead portion 44. The main electrode portion and lead portion 44 are formed integrally. The first and second ground internal electrodes 41, 42 are arranged such that their main electrode portions have respective longitudinal directions parallel to the opposing direction of the first and second side faces 4, 5. The first and second ground internal electrodes 41, 42 have about the same form and area and are arranged in a row in the transverse direction of the main electrode portions.

The first ground internal electrode 41 is arranged closer to the fourth side face 7. The four sides constituting the main electrode portion of the first ground internal electrode 41 are parallel to and separated from their corresponding side faces 4 to 7. The length of the first ground internal electrode 41 in the opposing direction of the third and fourth side faces 6, 7 is on a par with the length of each of the first to fourth signal internal electrodes 21 to 24 in the same direction.

The lead portion 43 is led from the center portion of one side of the main electrode portion of the first ground internal electrode 41 facing the forth side face 7 to the fourth side face 7, so that an end portion of the lead portion 43 is exposed at the fourth side face 7. The second ground terminal electrode 14 is formed such as to cover the end portion of the lead portion 43 exposed at the fourth side face 7. As a consequence, the first ground internal electrode 41 and the second ground terminal electrode 14 are connected to each other physically and electrically.

The first ground internal electrode 41 opposes the first and third signal internal electrodes 21, 23 through the dielectric layer 9 in the laminating direction. The main electrode portion of the first ground internal electrode 41 has regions 41A, 41B overlapping the first and third signal internal electrodes 21, 23, respectively, as seen in the laminating direction. The first ground internal electrode 41 has no region opposing any of the second and fourth signal internal electrodes 22, 24.

The region 41A of the first ground internal electrode 41 and the first signal internal electrode 21 construct a first capacitor C21. In the dielectric layer 9, the portion held between the region 41A of the first ground internal electrode 41 and the first signal internal electrode 21 is one substantially generating a capacitance component of the first capacitor C21.

The region 41B of the first ground internal electrode 41 and the third signal internal electrode 23 construct a third capacitor C23. In the dielectric layer 9, the portion held between the region 41B of the first ground internal electrode 41 and the third signal internal electrode 23 is one substantially generating a capacitance component of the third capacitor C23.

The area by which the third signal internal electrode 23 and the region 41B of the first ground internal electrode 41 that constitute the third capacitor C23 oppose each other is greater than the area by which the first signal internal electrode 21 and the region 41A of the first ground internal electrode 41 that constitute the first capacitor C21 oppose each other. Therefore, the capacitance of the third capacitor C23 is greater than that of the first capacitor C21.

The second ground internal electrode 42 is arranged closer to the third side face 6. The four sides constituting the main electrode portion of the second ground internal electrode 42 are parallel to and separated from their corresponding side faces 4 to 7. The length of the second ground internal electrode 42 in the opposing direction of the third and fourth side faces 6, 7 is on a par with the length of each of the first to fourth signal internal electrodes 21 to 24 in the same direction.

The lead portion 44 is led from the center portion of one side of the main electrode portion of the second inner electrode 42 facing the third side face 6 to the third side face 6, so that an end portion of the lead portion 44 is exposed at the third side face 6. The first ground terminal electrode 13 is formed such as to cover the end portion of the lead portion 44 exposed at the third side face 6. As a consequence, the second ground internal electrode 42 and the first ground terminal electrode 13 are connected to each other physically and electrically.

The second ground internal electrode 42 opposes the second and fourth signal internal electrodes 22, 24 through the dielectric layer 9 in the laminating direction. The main electrode portion of the second ground internal electrode 42 has regions 42A, 42B overlapping the second and fourth signal internal electrodes 22, 24, respectively, as seen in the laminating direction. The second ground internal electrode 42 has no region opposing any of the first and third signal internal electrodes 21, 23.

The region 42A of the second ground internal electrode 42 and the second signal internal electrode 22 construct a second capacitor C22. In the dielectric layer 9, the portion held between the region 42A of the second ground internal electrode 42 and the second signal internal electrode 22 is one substantially generating a capacitance component of the second capacitor C22.

The area by which the second signal internal electrode 22 and the region 42A of the second ground internal electrode 42 that constitute the second capacitor C22 oppose each other is greater than the area by which the first signal internal electrode 21 and the region 41A of the first ground internal electrode 41 that constitute the first capacitor C21 oppose each other. Therefore, the capacitance of the second capacitor C22 is greater than that of the first capacitor C21.

The area by which the second signal internal electrode 22 and the region 42A of the second ground internal electrode 42 that constitute the second capacitor C22 oppose each other is on a par with the area by which the third signal internal electrode 23 and the region 41B of the first ground internal electrode 41 that constitute the third capacitor C23 oppose each other. Therefore, the capacitance of the second capacitor C22 is on a par with that of the third capacitor C23.

The region 42B of the second ground internal electrode 42 and the fourth signal internal electrode 24 construct a fourth capacitor C24. In the dielectric layer 9, the portion held between the region 42B of the second ground internal electrode 42 and the fourth signal internal electrode 24 is one substantially generating a capacitance component of the fourth capacitor C24.

The area by which the fourth signal internal electrode 24 and the region 42B of the second ground internal electrode 42 that constitute the fourth capacitor C24 oppose each other is smaller than the area by which the third signal internal electrode 23 and the region 41B of the first ground internal electrode 41 that constitute the third capacitor C23 oppose each other. Therefore, the capacitance of the fourth capacitor C24 is smaller than that of the third capacitor C23.

The area by which the fourth signal internal electrode 24 and the region 42B of the second ground internal electrode 42 that constitute the fourth capacitor C24 oppose each other is on a par with the area by which the first signal internal electrode 21 and the region 41A of the first ground internal electrode 41 that constitute the first capacitor C21 oppose each other. Therefore, the capacitance of the fourth capacitor C24 is on a par with that of the first capacitor C21.

The multilayer capacitor C2 in accordance with this embodiment employs a structure in which the ground internal electrode 31 provided in the multilayer capacitor C1 in accordance with the first embodiment is divided into first and second ground internal electrodes 41, 42.

In thus constructed multilayer capacitor C2, the first signal terminal electrode 11 and second signal terminal electrode 12 are insulated from each other, while the first and second signal terminal electrodes 11, 12 are insulated from the first and second ground terminal electrodes 13, 14. As in the above-mentioned first embodiment, the first and second ground terminal electrodes 13, 14 are connected to the respective ground lines GL and thus are electrically connected to each other.

In the multilayer capacitor C2, as illustrated in FIG. 6, the first and second capacitors C21, C22 having respective capacitances different from each other are connected in parallel between the first signal terminal electrode 11 and the first and second ground terminal electrodes 13, 14. The third and fourth capacitors C23, C24 having respective capacitances different from each other are connected in parallel between the second signal terminal electrode 12 and the first and second ground terminal electrodes 13, 14. A set of the first and second capacitors C21, C22 and a set of the third and fourth capacitors C23, C24 are connected in series between the first and second signal terminal electrodes 11, 12.

In this embodiment, as in the foregoing, the first and second capacitors C21, C22 having respective capacitances different from each other are connected in parallel between the first signal terminal electrode 11 and the first and second ground terminal electrodes 13, 14. The third and fourth capacitors C23, C24 having respective capacitances different from each other are connected in parallel between the second signal terminal electrode 12 and the first and second ground terminal electrodes 13, 14. As a consequence, the bandwidth yielding low impedance becomes wider.

In this embodiment, the first and third capacitors C21, C23 are constructed by the first ground internal electrode 41 and the first and third signal terminal electrodes 21, 23, while the second and fourth capacitors C22, C24 are constructed by the second ground internal electrode 42 and the second and fourth signal internal electrodes 22, 24. The first ground internal electrode 41 has no region opposing any of the second and fourth signal internal electrodes 22, 24, while the second ground internal electrode 42 has no region opposing any of the first and third signal internal electrodes 21, 23. This can inhibit crosstalk from occurring between a set of the first and third capacitors C21, C23 and a set of the second and fourth capacitors C22, C24.

This embodiment arranges the first and second ground internal electrodes 41, 42 on the same layer. This reduces the total number of laminations of the inner electrodes and dielectric layers for yielding a desirable capacitance in the first to fourth capacitors C11 to C14, whereby the multilayer capacitor C2 (capacitor element body 1) can attain a lower profile.

Since the first and second ground internal electrodes 41, 42 are arranged separately from each other, a surface of the dielectric layer 9 is exposed at the gap between the first and second ground internal electrodes 41, 42. The surface of the dielectric layer 9 exposed at the gap between the first and second ground internal electrodes 41, 42 comes into close contact with the dielectric layer 9 positioned between a set of the first and second ground internal electrodes 41, 42 and a set of the first to fourth signal internal electrodes 21 to 24. This can improve the bonding strength of two dielectric layers 9 holding the first and second ground internal electrodes 41, 42 therebetween.

This embodiment constructs the first and third capacitors C21, C23 by arranging the first and third signal internal electrodes 21, 23 such that they oppose the first ground internal electrode 41 through the dielectric layer 9. Therefore, the first and third capacitors C21, C23 can share the first ground internal electrode 41. The second and fourth signal internal electrodes 22, 24 are arranged such as to oppose the second ground internal electrode 42 through the dielectric layer 9, thereby constructing the second and fourth capacitors C22, C24. Therefore, the second and fourth capacitors C22, C24 can share the second ground internal electrode 42. Hence, the multilayer capacitor C2 can be made smaller The first ground internal electrode 41 functions to connect each of the first and third capacitors C21, C23 to the second ground terminal electrode 14. The second ground internal electrode 42 functions to connect each of the second and fourth capacitors C22, C24 to the first ground terminal electrode 13. Therefore, the multilayer capacitor C2 can be made smaller.

Third Embodiment

Figure 7:
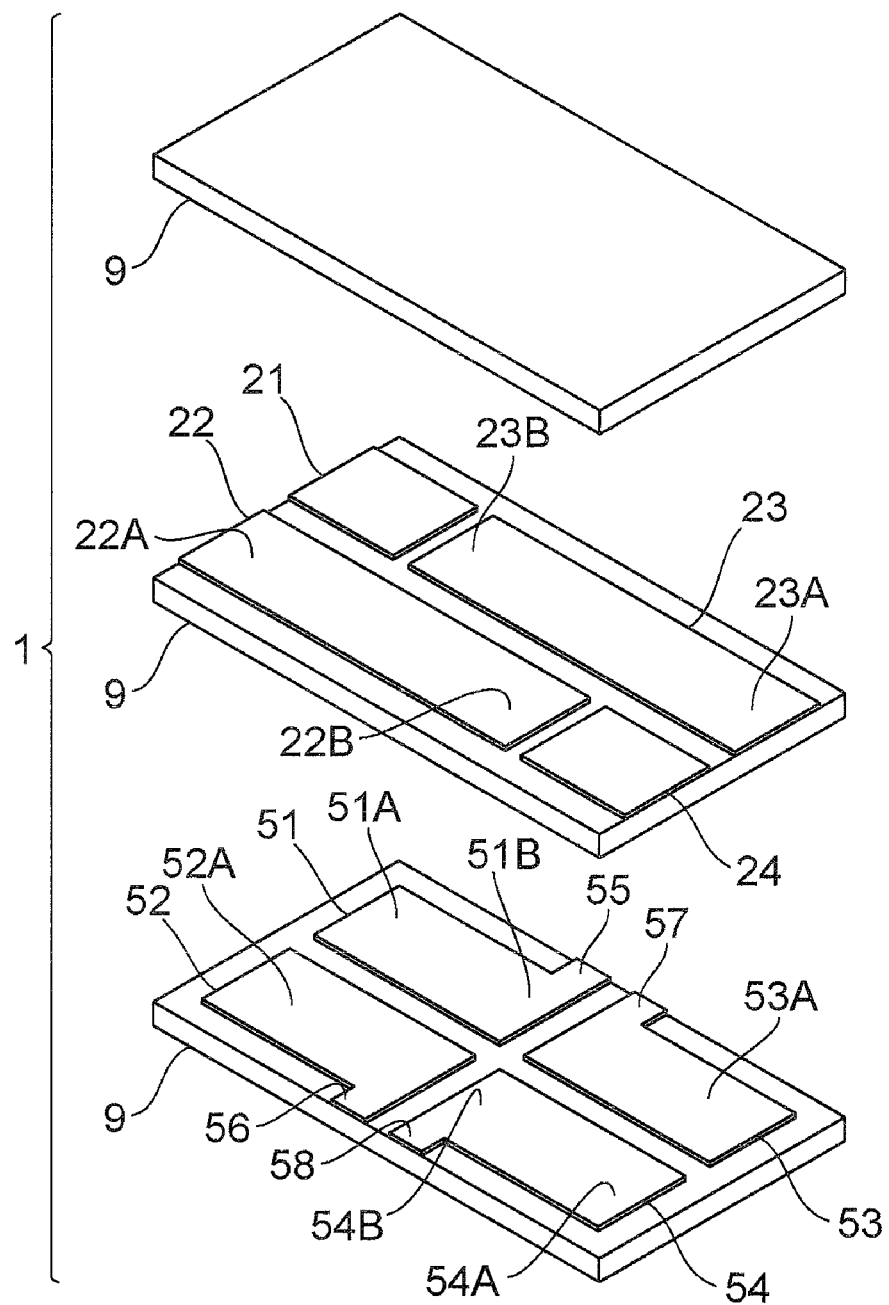
FIG. 7 is an exploded perspective view of a capacitor element body included in the multilayer capacitor in accordance with a third embodiment.
Figure 8A:
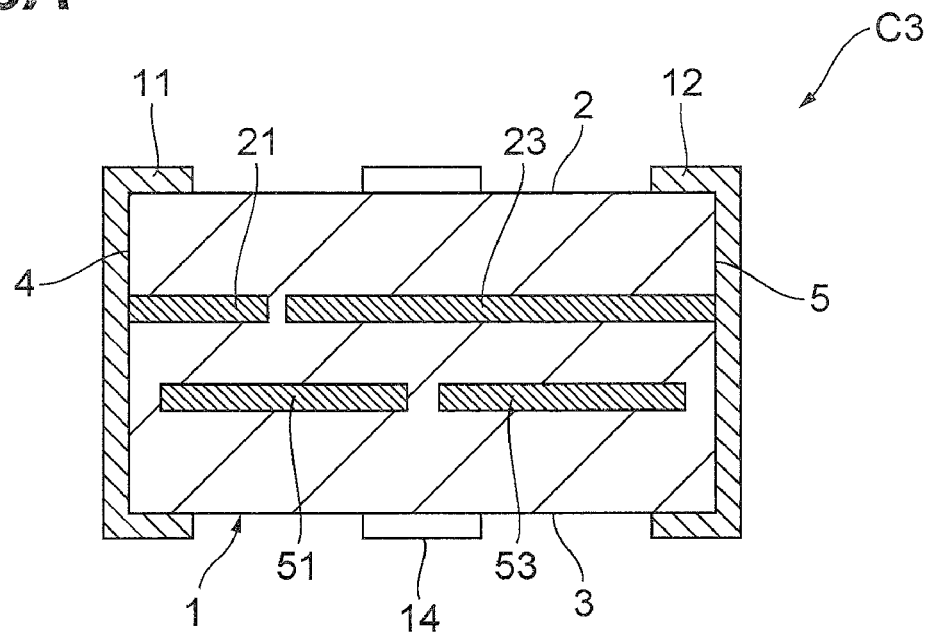
FIGS. 8A and 8B are views illustrating cross-sectional structures of the multilayer capacitor in accordance with the third embodiment.
Figure 8B:
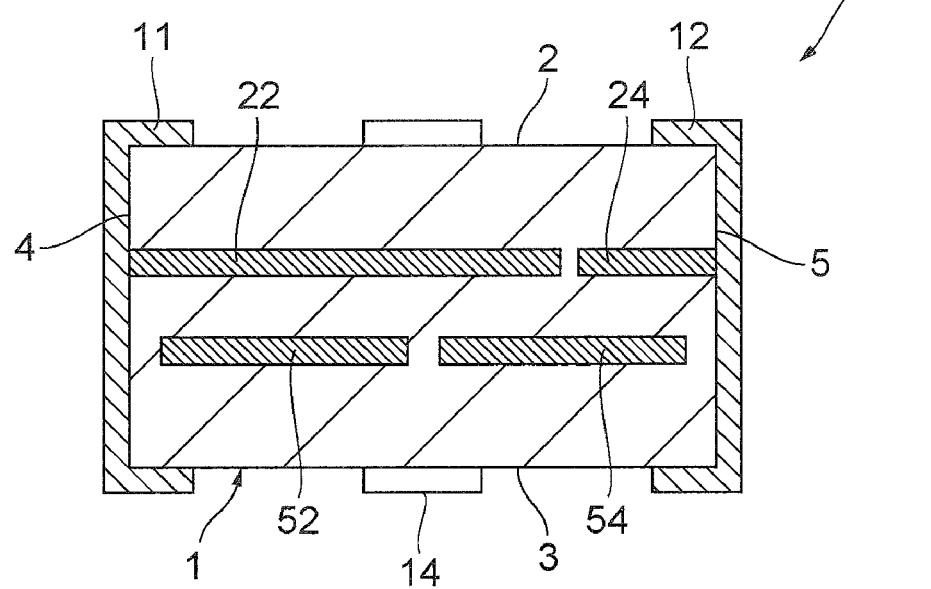
Figure 9:
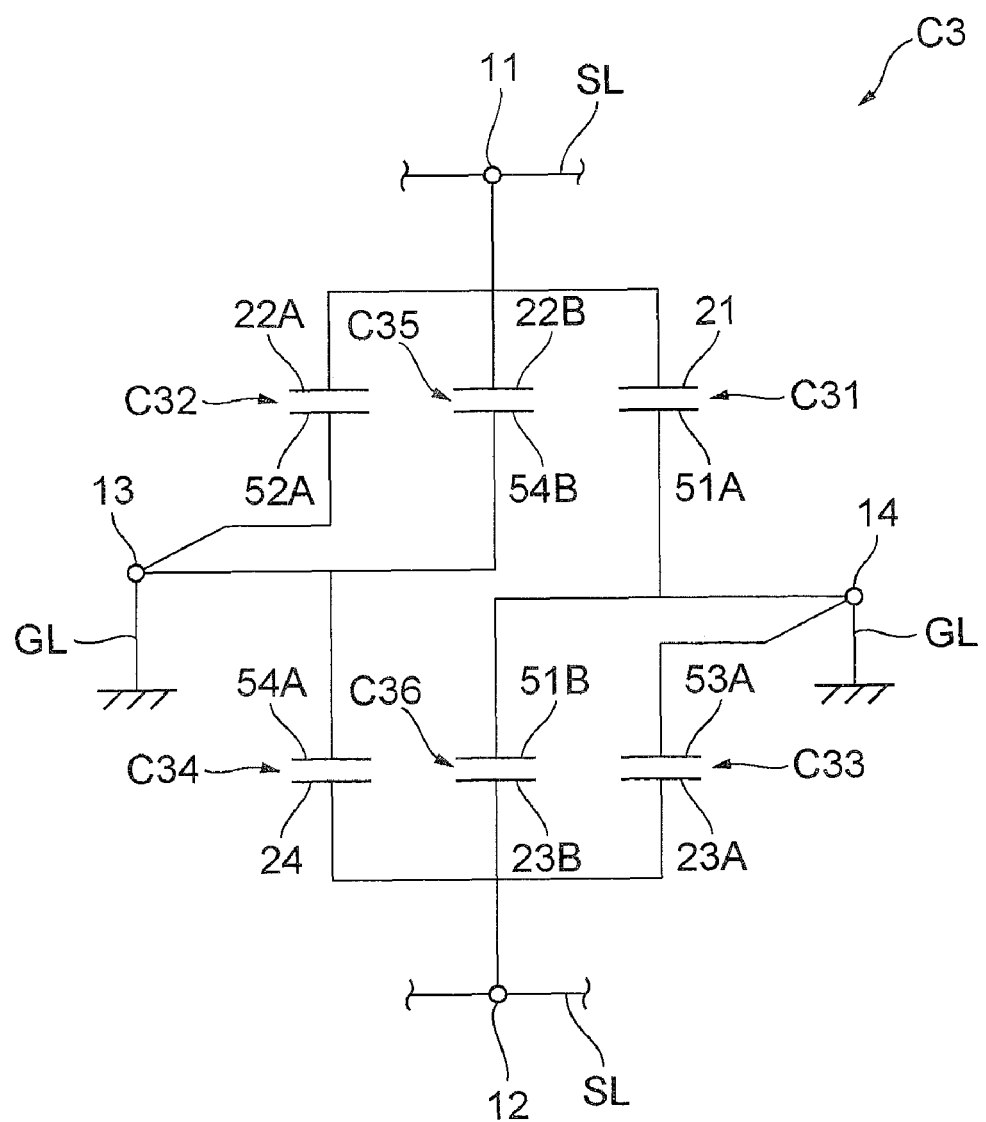
FIG. 9 is an equivalent circuit diagram of the multilayer capacitor in accordance with the third embodiment.

With reference to FIGS. 7 to 9, the structure of the multilayer capacitor C3 in accordance with the third embodiment will be explained. FIG. 7 is an exploded perspective view of a capacitor element body included in the multilayer capacitor in accordance with the third embodiment. FIGS. 8A and 8B are views illustrating cross-sectional structures of the multilayer capacitor in accordance with the third embodiment. FIG. 9 is an equivalent circuit diagram of the multilayer capacitor in accordance with the third embodiment.

As illustrated in FIGS. 7, 8A, and 8B, the multilayer capacitor C3 in accordance with the third embodiment comprises the first to fourth signal internal electrodes 21 to 24 as with the multilayer capacitor C1 in accordance with the first embodiment. The multilayer capacitor C3 in accordance with this embodiment comprises a first ground internal electrode 51, a second ground internal electrode 52, a third ground internal electrode 53, and a fourth ground internal electrode 54 instead of the above-mentioned ground internal electrode 31.

FIGS. 8A and 8B illustrate respective cross-sectional structures of the capacitor element body 1 cut along planes parallel to the third and fourth side faces 6, 7. FIG. 8A illustrates the structure in the case where the capacitor element body 1 is cut such that the cross section includes the first and third signal internal electrodes 21, 23, while FIG. 8B illustrates the structure in the case where the capacitor element body 1 is cut such that the cross section includes the second and fourth signal internal electrodes 22, 24.

The first to fourth ground internal electrodes 51 to 54 are arranged on a layer adjacent through the dielectric layer 9 in the laminating direction to a layer on which the first to fourth signal internal electrodes 21 to 24 are arranged. The first to fourth ground internal electrodes 51 to 54 are separated from each other on the same layer. The first to fourth ground internal electrodes 51 to 54 have about the same form and area. The first to fourth ground internal electrodes 51 to 54 are arranged two by two along the opposing direction of the first and second side faces 4, 5 and the opposing direction of the third and fourth side faces 6, 7. The first ground internal electrode 51 has a main electrode portion formed like a rectangle and a lead portion 55. The main electrode portion and lead portion 55 are formed integrally. The second ground internal electrode 52 has a main electrode portion formed like a rectangle and a lead portion 56. The main electrode portion and lead portion 56 are formed integrally. The third ground internal electrode 53 has a main electrode portion formed like a rectangle and a lead portion 57. The main electrode portion and lead portion 57 are formed integrally. The fourth ground internal electrode 54 has a main electrode portion formed like a rectangle and a lead portion 58. The main electrode portion and lead portion 58 are formed integrally. The four sides constituting the main electrode portions of the first to fourth ground internal electrodes 51 to 54 are parallel to and separated from the side faces 4 to 7.

The first ground internal electrode 51 is arranged closer to the first and fourth side faces 4, 7. The lead portion 55 is led from an end portion of the main electrode portion of the first ground internal electrode 51 closer to the second and fourth side faces 5, 7 to the fourth side face 7, so that an end portion of the lead portion 55 is exposed at the fourth side face 7. The second ground terminal electrode 14 is formed such as to cover the end portion of the lead portion 55 exposed at the fourth side face 7. As a consequence, the first ground internal electrode 51 and the second ground terminal electrode 14 are connected to each other physically and electrically.

The main electrode portion of the first ground internal electrode 51 has a region 51A overlapping the first signal internal electrode 21 as seen in the laminating direction. The region 51A opposes the first signal internal electrode 21 through the dielectric layer 9 in the laminating direction. Therefore, the region 51A of the first ground internal electrode 51 and the first signal internal electrode 21 construct a first capacitor C31.

The main electrode portion of the first ground internal electrode 51 has a region 51B overlapping the third signal internal electrode 23 as seen in the laminating direction. The region 51B opposes a region 23B of the third signal internal electrode 23 closer to the first side face 4 through the dielectric layer 9 in the laminating direction. Therefore, the region 51B of the first ground internal electrode 51 and the region 23B of the third signal internal electrode 23 construct a sixth capacitor C36. The first ground internal electrode 51 has no region opposing any of the second and fourth signal internal electrodes 22, 24.

The second ground internal electrode 52 is arranged closer to the first and third side faces 4, 6. The lead portion 56 is led from an end portion of the main electrode portion of the second ground internal electrode 52 closer to the second and third side faces 5, 6 to the third side face 6, so that an end portion of the lead portion 56 is exposed at the third side face 6. The first ground terminal electrode 13 is formed such as to cover the end portion of the lead portion 56 exposed at the third side face 6. As a consequence, the second ground internal electrode 52 and the first ground terminal electrode 13 are connected to each other physically and electrically.

The main electrode portion of the second ground internal electrode 52 has a region 52A overlapping the second signal internal electrode 22 as seen in the laminating direction. The region 52A opposes a region 22A of the second signal internal electrode 22 closer to the first side face 4 through the dielectric layer 9 in the laminating direction. Therefore, the region 52A of the second ground internal electrode 52 and the region 22A of the second signal internal electrode 22 construct a second capacitor C32. The second ground internal electrode 52 has no region opposing any of the first, third, and fourth signal internal electrodes 21, 23, 24.

The third ground internal electrode 53 is arranged closer to the second and fourth side faces 5, 7. The lead portion 57 is led from an end portion of the main electrode portion of the third ground internal electrode 53 closer to the first and fourth side faces 4, 7 to the fourth side face 7, so that an end portion of the lead portion 57 is exposed at the fourth side face 7. The second ground terminal electrode 14 is formed such as to cover the end portion of the lead portion 57 exposed at the fourth side face 7. As a consequence, the third ground internal electrode 53 and the second ground terminal electrode 14 are connected to each other physically and electrically.

The main electrode portion of the third ground internal electrode 53 has a region 53A overlapping the third signal internal electrode 23 as seen in the laminating direction. The region 53A opposes a region 23A of the third signal internal electrode 23 closer to the second side face 5 through the dielectric layer 9 in the laminating direction. Therefore, the region 53A of the third ground internal electrode 53 and the region 23A of the third signal internal electrode 23 construct a third capacitor C33. The third ground internal electrode 53 has no region opposing any of the first, second, and fourth signal internal electrodes 21, 22, 24.

The fourth ground internal electrode 54 is arranged closer to the second and third side faces 5, 6. The lead portion 58 is led from an end portion of the main electrode portion of the fourth ground internal electrode 54 closer to the first and third side faces 4, 6 to the third side face 6, so that an end portion of the lead portion 58 is exposed at the third side face 6. The first ground terminal electrode 13 is formed such as to cover the end portion of the lead portion 58 exposed at the third side face 6. As a consequence, the fourth ground internal electrode 54 and the first ground terminal electrode 13 are connected to each other physically and electrically.

The fourth ground internal electrode 54 has a region 54A overlapping the fourth signal internal electrode 24 as seen in the laminating direction. The region 54A opposes the fourth signal internal electrode 24 through the dielectric layer 9 in the laminating direction. Therefore, the region 54A of the fourth ground internal electrode 54 and the first signal internal electrode 24 construct a fourth capacitor C34.

The main electrode portion of the fourth ground internal electrode 54 has a region 54B overlapping the second signal internal electrode 22 as seen in the laminating direction. The region 54B opposes a region 22B of the second signal internal electrode 22 closer to the second side face 5 through the dielectric layer 9 in the laminating direction. Therefore, the region 54B of the fourth ground internal electrode 54 and the region 22B of the second signal internal electrode 22 construct a fifth capacitor C35. The fourth ground internal electrode 54 has no region opposing any of the first and third signal internal electrodes 21, 23.

The multilayer capacitor C3 in accordance with this embodiment employs a structure in which the first and second ground internal electrodes 41, 42 provided in the multilayer capacitor C2 in accordance with the second embodiment are respectively divided into the first and second ground internal electrodes 51, 52 and the third and fourth ground internal electrodes 53, 54.

In thus constructed multilayer capacitor C3 in accordance with this embodiment, the first signal terminal electrode 11 and second signal terminal electrode 12 are insulated from each other, while the first and second signal terminal electrodes 11, 12 are insulated from the first and second ground terminal electrodes 13, 14. As in the first embodiment, the first and second ground terminal electrodes 13, 14 are connected to respective ground lines GL and thus are electrically connected to each other.

In the multilayer capacitor C3 of this embodiment, as illustrated in FIG. 9, the first, second, and fifth capacitors C31, C32, C35 are connected in parallel between the first signal terminal electrode 11 and the first and second ground terminal electrodes 13, 14. The third, fourth, and sixth capacitors C33, C34, C36 are connected in parallel between the second signal terminal electrode 12 and the first and second ground terminal electrodes 13, 14. A set of the first, second, and fifth capacitors C31, C32, C35 and a set of the third, fourth, and sixth capacitors C33, C34, C36 are connected in series between the first and second signal terminal electrodes 11, 12.

In this embodiment, as in the foregoing, the first, second, and fifth capacitors C31, C32, C35 having respective capacitances different from each other are connected in parallel between the first signal terminal electrode 11 and the first and second ground terminal electrodes 13, 14. The third, fourth, and sixth capacitors C33, C34, C36 having respective capacitances different from each other are connected in parallel between the second signal terminal electrode 12 and the first and second ground terminal electrodes 13, 14. As a consequence, the bandwidth yielding low impedance becomes wider.

In this embodiment, the first and third ground internal electrodes 51, 53 have no regions opposing any of the second and fourth signal internal electrodes 22, 24 in the laminating direction. The second and fourth ground internal electrodes 52, 54 have no regions opposing any of the first and third signal internal electrodes 21, 23 in the laminating direction. As a consequence, crosstalk can be inhibited from occurring between the set of the first, third, and sixth capacitors C31, C33, C36 constructed by the first and third signal internal electrodes 21, 23 and the first and third ground internal electrodes 51, 53 and the set of the second, fourth, and fifth capacitors C32, C34, C35 constructed by the second and fourth signal internal electrodes 22, 24 and the second and fourth ground internal electrodes 52, 54.

Since the first to fourth ground internal electrodes 51 to 54 are arranged separately from each other on the same layer, a surface of the dielectric layer 9 is exposed from the gaps between the first to fourth ground internal electrodes 51 to 54. The exposed surface of the dielectric layer 9 comes into close contact with the dielectric layer 9 held between a set of the first to fourth ground internal electrodes 51 to 54 and a set of the first to fourth signal internal electrodes 21 to 24. This can improve the bonding strength of two dielectric layers 9 holding the first to fourth ground internal electrodes 51 to 54 therebetween.

Fourth Embodiment

Figure 10:
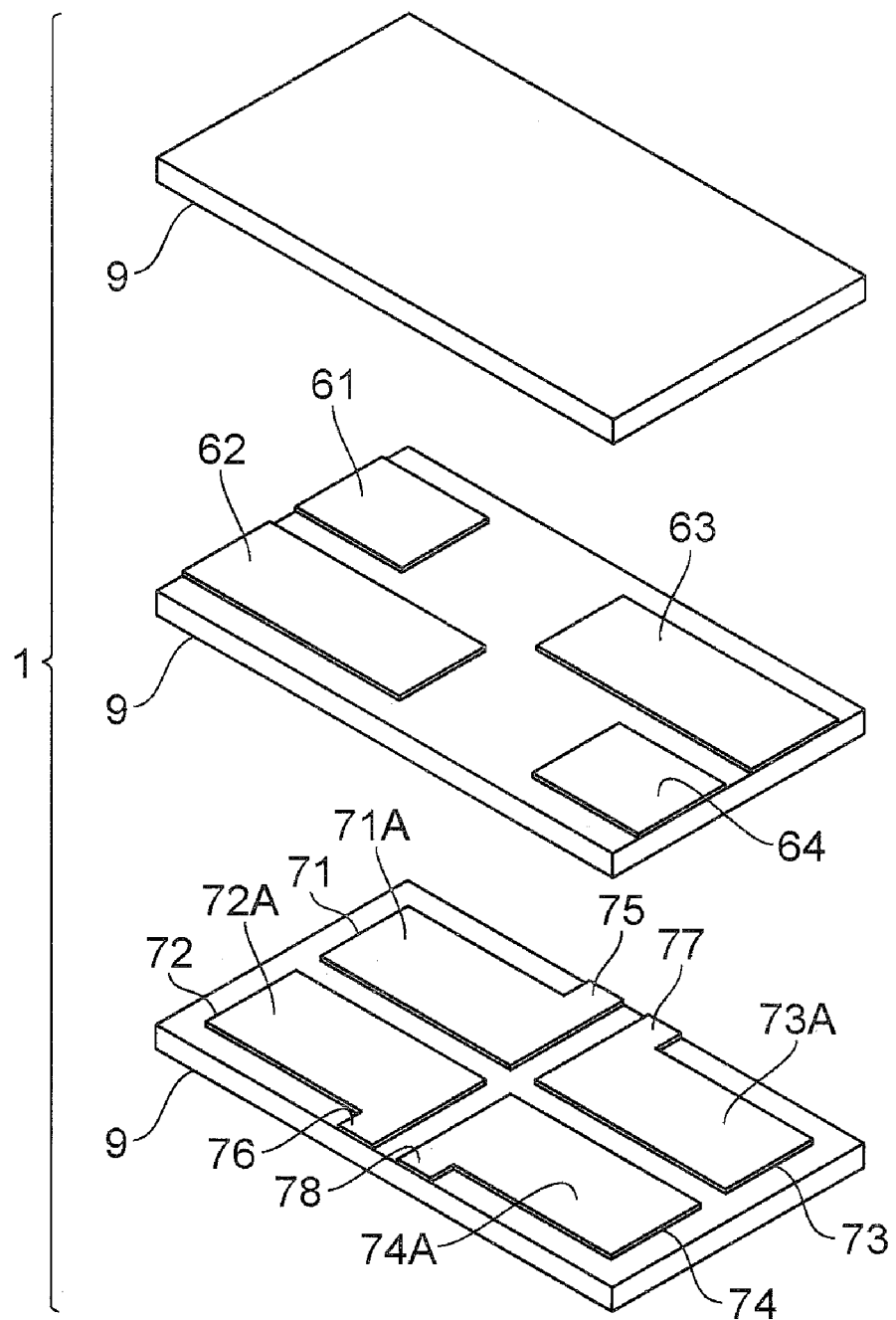
FIG. 10 is an exploded perspective view of a capacitor element body included in the multilayer capacitor in accordance with a fourth embodiment.
Figure 11A:
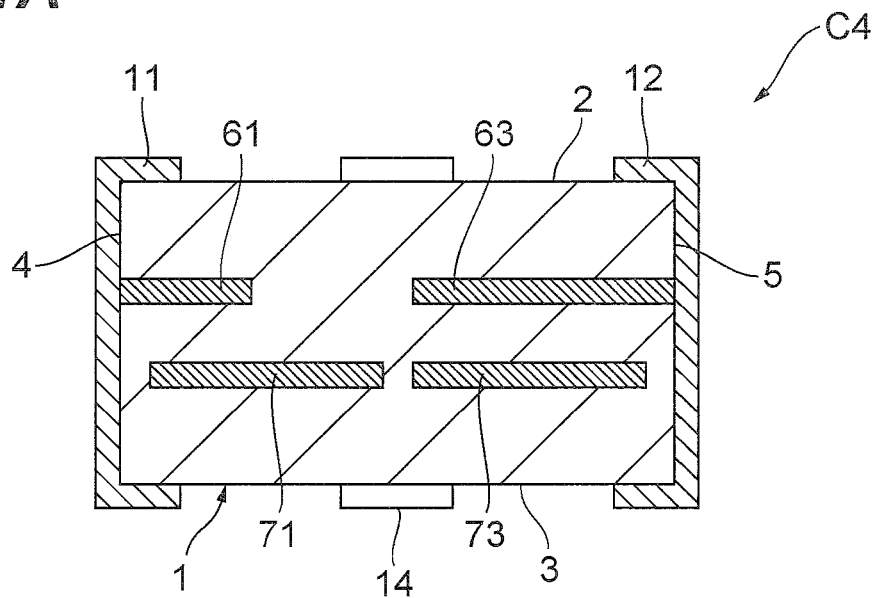
FIGS. 11A and 11B are views illustrating cross-sectional structures of the multilayer capacitor in accordance with the fourth embodiment.
Figure 11B:
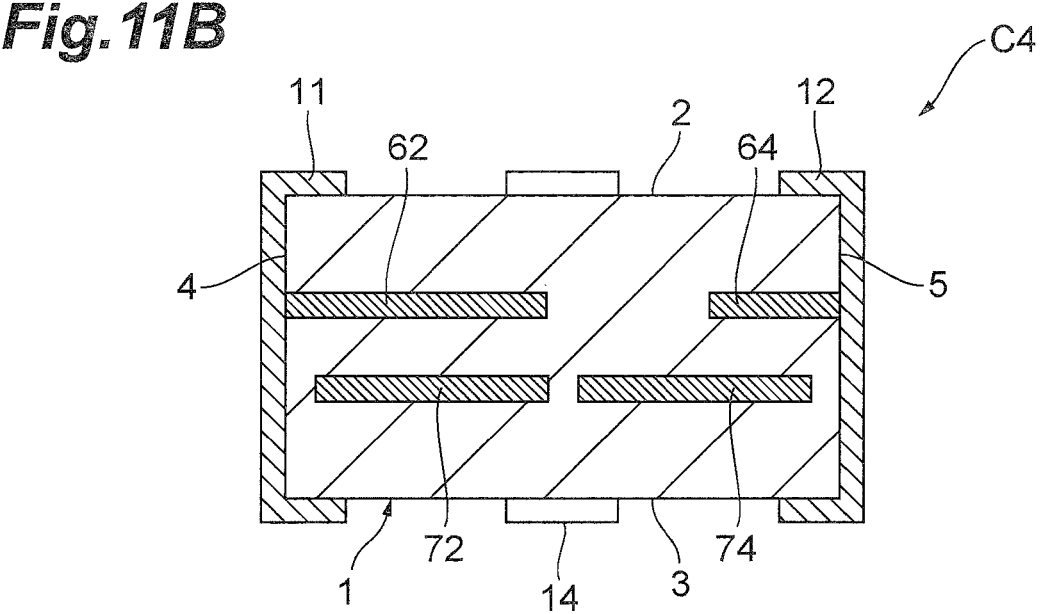
Figure 12:
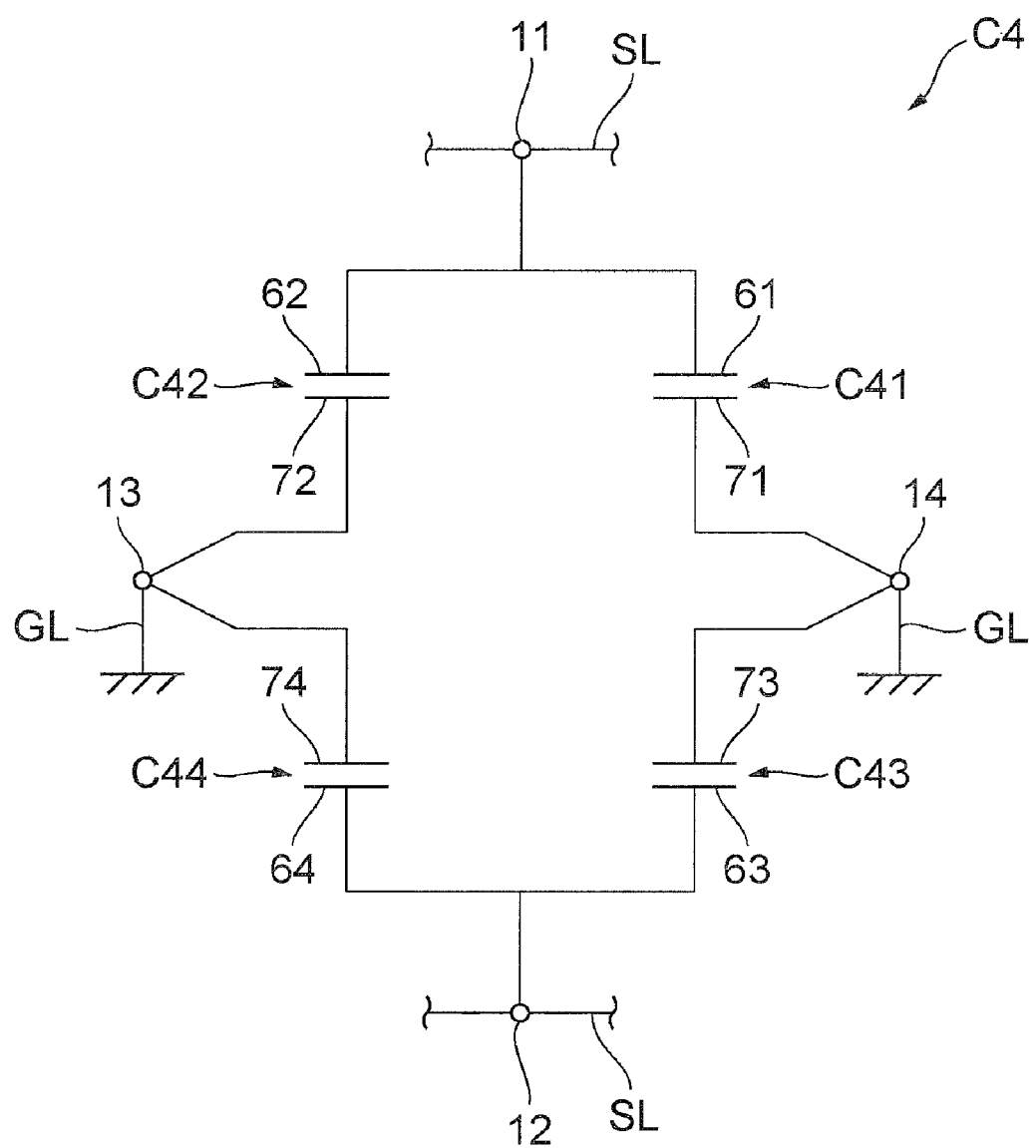
FIG. 12 is an equivalent circuit diagram of the multilayer capacitor in accordance with the fourth embodiment.

With reference to FIGS. 10 to 12, the structure of the multilayer capacitor C4 in accordance with the fourth embodiment will be explained. FIG. 10 is an exploded perspective view of a capacitor element body included in the multilayer capacitor in accordance with the fourth embodiment. FIGS. 11A and 11B are views illustrating cross-sectional structures of the multilayer capacitor in accordance with the fourth embodiment. FIG. 12 is an equivalent circuit diagram of the multilayer capacitor in accordance with this embodiment.

As illustrated in FIGS. 10, 11A, and 11B, the multilayer capacitor C4 in accordance with this embodiment comprises first to fourth signal internal electrodes 61 to 64 instead of the above-mentioned first to fourth signal internal electrodes 21 to 24. The multilayer capacitor C4 comprises first to fourth ground internal electrodes 71 to 74. The first to fourth ground internal electrodes 71 to 74 are arranged as with the above-mentioned first to fourth ground internal electrodes 51 to 54, respectively, in terms of their forms and positions.

FIGS. 11A and 11B illustrate respective cross-sectional structures of the capacitor element body 1 cut along planes parallel to the third and fourth side faces 6, 7. FIG. 11A illustrates the structure in the case where the capacitor element body 1 is cut such that the cross section includes the first and third signal internal electrodes 61, 63, while FIG. 11B illustrates the structure in the case where the capacitor element body 1 is cut such that the cross section includes the second and fourth signal internal electrodes 62, 64.

The first to fourth signal internal electrodes 61 to 64 are formed like rectangles and arranged separately from each other on the same layer.

The first signal internal electrode 61 is arranged closer to the first and fourth side faces 4, 7. The first signal internal electrode 61 is arranged such that one side thereof closer to the fourth side face 7 is parallel to and separated from the fourth side face 7. One side of the first signal internal electrode 61 facing the first side face 4 is exposed at the first side face 4. As a consequence, the first signal internal electrode 61 is connected physically and electrically to the first signal terminal electrode 11 covering the first side face 4.

The second signal internal electrode 62 is arranged closer to the first and third side faces 4, 6. The second signal internal electrode 62 is arranged such that one side thereof closer to the third side face 6 is parallel to and separated from the third side face 6. One side of the second signal internal electrode 62 facing the first side face 4 is exposed at the first side face 4. As a consequence, the second signal internal electrode 62 is connected physically and electrically to the first signal terminal electrode 11 covering the first side face 4.

The third signal internal electrode 63 is arranged closer to the second and fourth side faces 5, 7. The third signal internal electrode 63 is arranged such that one side thereof closer to the fourth side face 7 is parallel to and separated from the fourth side face 7. One side of the third signal internal electrode 63 facing the second side face 5 is exposed at the second side face 5. As a consequence, the third signal internal electrode 63 is connected physically and electrically to the second signal terminal electrode 12 covering the second side face 5.

The fourth signal internal electrode 64 is arranged closer to the second and third side faces 5, 6. The fourth signal internal electrode 64 is arranged such that one side thereof closer to the third side face 6 is parallel to and separated from the third side face 6. One side of the fourth signal internal electrode 64 facing the second side face 5 is exposed at the second side face 5. As a consequence, the fourth signal internal electrode 64 is connected physically and electrically to the second signal terminal electrode 12 covering the second side face 5.

The area of the first signal internal electrode 61 is smaller than that of the second signal internal electrode 62. The area of the second signal internal electrode 62 is greater than that of the fourth signal internal electrode 64. The area of the second signal internal electrode 62 is on a par with that of the third signal internal electrode 63, while the area of the fourth signal internal electrode 64 is on a par with that of the first signal internal electrode 61.

The first to fourth ground internal electrodes 71 to 74 are arranged on a layer adjacent through the dielectric layer 9 in the laminating direction to a layer on which the first to fourth signal internal electrodes 61 to 64 are arranged. The first to fourth ground internal electrodes 71 to 74 are separated from each other on the same layer. The first to fourth ground internal electrodes 71 to 74 have about the same form and area. The first to fourth ground internal electrodes 71 to 74 are arranged two by two along the opposing direction of the first and second side faces 4, 5 and the opposing direction of the third and fourth side faces 6, 7. The first ground internal electrode 71 has a main electrode portion formed like a rectangle and a lead portion 75. The main electrode portion and lead portion 75 are formed integrally. The second ground internal electrode 72 has a main electrode portion formed like a rectangle and a lead portion 76. The main electrode portion and lead portion 76 are formed integrally. The third ground internal electrode 73 has a main electrode portion formed like a rectangle and a lead portion 77. The main electrode portion and lead portion 77 are formed integrally. The fourth ground internal electrode 74 has a main electrode portion formed like a rectangle and a lead portion 78. The main electrode portion and lead portion 78 are formed integrally. The four sides constituting the main electrode portion of each of the first to fourth ground internal electrodes 71 to 74 are parallel to and separated from their corresponding side faces 4 to 7.

The first ground internal electrode 71 is arranged closer to the first and fourth side faces 4, 7. The lead portion 75 is led from an end portion of the main electrode portion of the first ground internal electrode 71 closer to the second and fourth side faces 5, 7 to the fourth side face 7, so that an end portion of the lead portion 75 is exposed at the fourth side face 7. The second ground terminal electrode 14 is formed such as to cover the end portion of the lead portion 75 exposed at the fourth side face 7. As a consequence, the first ground internal electrode 71 and the second ground terminal electrode 14 are connected physically and electrically to each other.

The main electrode portion of the first ground internal electrode 71 has a region 71A overlapping the first signal internal electrode 61 as seen in the laminating direction. The region 71A opposes the first signal internal electrode 61 through the dielectric layer 9 in the laminating direction. As a consequence, the region 71A of the first ground internal electrode 71 and the first signal internal electrode 61 construct a first capacitor C41. The first ground internal electrode 71 has no region opposing any of the second to fourth signal internal electrodes 62 to 64.

The second ground internal electrode 72 is arranged closer to the first and third side faces 4, 6. The lead portion 76 is led from an end portion of the main electrode portion of the second ground internal electrode 72 closer to the second and third side faces 5, 6 to the third side face 6, so that an end portion of the lead portion 76 is exposed at the third side face 6. The first ground terminal electrode 13 is formed such as to cover the end portion of the lead portion 76 exposed at the third side face 6. As a consequence, the second ground internal electrode 72 and the first ground terminal electrode 13 are connected physically and electrically to each other.

The main electrode portion of the second ground internal electrode 72 has a region 72A overlapping the second signal internal electrode 62 as seen in the laminating direction. The region 72A opposes the second signal internal electrode 62 through the dielectric layer 9 in the laminating direction. As a consequence, the region 72A of the second ground internal electrode 72 and the second signal internal electrode 62 construct a second capacitor C42. The second ground internal electrode 72 has no region opposing any of the first, third, and fourth signal internal electrodes 61, 63, and 64.

The third ground internal electrode 73 is arranged closer to the second and fourth side faces 5, 7. The lead portion 77 is led from an end portion of the main electrode portion of the third ground internal electrode 73 closer to the first and fourth side faces 4, 7 to the fourth side face 7, so that an end portion of the lead portion 77 is exposed at the fourth side face 7. The second ground terminal electrode 14 is formed such as to cover the end portion of the lead portion 77 exposed at the fourth side face 7. As a consequence, the third ground internal electrode 73 and the second ground terminal electrode 14 are connected physically and electrically to each other.

The main electrode portion of the third ground internal electrode 73 has a region 73A overlapping the third signal internal electrode 63 as seen in the laminating direction. The region 73A opposes the third signal internal electrode 63 through the dielectric layer 9 in the laminating direction. As a consequence, the region 73A of the third ground internal electrode 73 and the third signal internal electrode 63 construct a third capacitor C43. The third ground internal electrode 73 has no region opposing any of the first, second, and fourth signal internal electrodes 61, 62, 64.

The fourth ground internal electrode 74 is arranged closer to the second and third side faces 5, 6. The lead portion 78 is led from an end portion of the main electrode portion of the fourth ground internal electrode 74 closer to the first and third side faces 4, 6 to the third side face 6, so that an end portion of the lead portion 78 is exposed at the third side face 6. As a consequence, the fourth ground internal electrode 74 and the first ground terminal electrode 13 are connected physically and electrically to each other.

The main electrode portion of the fourth ground internal electrode 74 has a region 74A overlapping the fourth signal internal electrode 64 as seen in the laminating direction. The region 74A opposes the fourth signal internal electrode 64 through the dielectric layer 9 in the laminating direction. As a consequence, the region 74A of the fourth ground internal electrode 74 and the fourth signal internal electrode 64 construct a fourth capacitor C44. The fourth ground internal electrode 74 has no region opposing any of the first to third signal internal electrodes 61 to 63.

The first and second capacitors C41, C42 differ from each other in terms of the areas by which their constituent inner electrodes oppose each other. The capacitance of the first capacitor C41 is smaller than that of the second capacitor C42. The third and fourth capacitors C43, C44 differ from each other in terms of the areas by which their constituent inner electrodes oppose each other. The capacitance of the third capacitor C43 is greater than that of the fourth capacitor C44. The capacitance of the first capacitor C41 is on a par with that of the fourth capacitor C44, while the capacitance of the second capacitor C42 is on a par with that of the third capacitor C43.

In thus constructed multilayer capacitor C4 in accordance with this embodiment, the first signal terminal electrode 11 and second signal terminal electrode 12 are insulated from each other, while the first and second signal terminal electrodes 11, 12 are insulated from the first and second ground terminal electrodes 13, 14. As in the above-mentioned first embodiment, the first and second ground terminal electrodes 13, 14 are connected to the respective ground lines GL and thus are electrically connected to each other.

In the multilayer capacitor C4 of this embodiment, as illustrated in FIG. 12, the first and second capacitors C41, C42 having respective capacitances different from each other are connected in parallel between the first signal terminal electrode 11 and the first and second ground terminal electrodes 13, 14. The third and fourth capacitors C43, C44 having respective capacitances different from each other are connected in parallel between the second signal terminal electrode 12 and the first and second ground terminal electrodes 13, 14. A set of the first and second capacitors C41, C42 and a set of the third and fourth capacitors C43, C44 are connected in series between the first and second signal terminal electrodes 11, 12.

In this embodiment, as in the foregoing, the first and second capacitors C41, C42 having respective capacitances different from each other are connected in parallel between the first signal terminal electrode 11 and the first and second ground terminal electrodes 13, 14. The third and fourth capacitors C43, C44 having respective capacitances different from each other are connected in parallel between the second signal terminal electrode 12 and the first and second ground terminal electrodes 13, 14. As a consequence, the bandwidth yielding low impedance becomes wider.

In this embodiment, the first ground internal electrode 71 has no region opposing any of the second to fourth signal internal electrodes 62 to 64 in the laminating direction. The second ground internal electrode 72 has no region opposing any of the first, third, and fourth signal internal electrodes 61, 63, 64 in the laminating direction. The third ground internal electrode 73 has no region opposing any of the first, second, and fourth signal internal electrodes 61, 62, 64 in the laminating direction. The fourth ground internal electrode 74 has no region opposing any of the first to third signal internal electrodes 61 to 63 in the laminating direction. Therefore, crosstalk can be inhibited from occurring among the first to fourth capacitors C41 to C44.

Though preferred embodiments of the present invention are explained in the foregoing, the present invention is not necessarily limited to the above-mentioned embodiments but can be modified in various ways within the scope not deviating from the gist thereof.

For example, though the multilayer capacitor C1 is equipped with the second ground terminal electrode 14 in the first embodiment, the second ground terminal electrode 14 may be omitted. The fourth signal internal electrode 24, 64 is provided in the first to fourth embodiments but may be omitted. The first to fourth signal internal electrodes 21 to 24, 61 to 64 may be arranged on different layers instead of the same layer as in the first to fourth embodiments. The first and second ground internal electrodes 41, 42 or the first to fourth ground internal electrodes 51 to 54, 71 to 74 may be arranged on different layers instead of the same layer as in the second to fourth embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
a capacitor element body;
a first signal terminal electrode, a second signal terminal electrode, and a ground terminal electrode each arranged on an outer surface of the capacitor element body; and
a ground internal electrode and first to third signal internal electrodes each arranged within the capacitor element body;
wherein the ground internal electrode is connected to the ground terminal electrode;
wherein the first signal internal electrode is connected to the first signal terminal electrode and opposes the ground internal electrode so as to construct a first capacitor;
wherein the second signal internal electrode is connected to the first signal terminal electrode and opposes the ground internal electrode so as to construct a second capacitor;
wherein the third signal internal electrode is connected to the second signal terminal electrode and opposes the ground internal electrode so as to construct a third capacitor; and
wherein the first and second capacitors have respective capacitances different from each other.

2. A multilayer capacitor according to claim 1, further comprising a fourth signal internal electrode arranged within the capacitor element body;
wherein the fourth signal internal electrode is connected to the second signal terminal electrode and opposes the ground internal electrode so as to construct a fourth capacitor; and wherein the third and fourth capacitors have respective capacitances different from each other.

3. A multilayer capacitor according to claim 2, wherein the first to fourth signal internal electrodes are arranged on the same layer;
wherein the first and second signal internal electrodes have respective areas different from each other; and
wherein the third and fourth signal internal electrodes have respective areas different from each other.

4. A multilayer capacitor according to claim 1, wherein the ground terminal electrode includes first and second ground terminal electrodes arranged separately from each other;
wherein the ground internal electrode includes first and second ground internal electrodes arranged separately from each other;
wherein the first ground internal electrode is connected to the first ground terminal electrode and has a region opposing the first signal internal electrode but no region opposing the second signal internal electrode; and
wherein the second ground internal electrode is connected to the second ground terminal electrode and has a region opposing the second signal internal electrode but no region opposing the first signal internal electrode.

5. A multilayer capacitor according to claim 4, wherein the first ground internal electrode includes first and second electrode parts arranged separately from each other;
wherein the first electrode part of the first ground internal electrode is connected to the first ground terminal electrode and has a region opposing the first signal internal electrode; and
wherein the second electrode part of the first ground internal electrode is connected to the first ground terminal electrode and has a region opposing the third signal internal electrode.

6. A multilayer capacitor according to claim 5, wherein the first electrode part of the first ground internal electrode has no region opposing the third signal internal electrode; and
wherein the second electrode part of the first ground internal electrode has no region opposing the first signal internal electrode.

7. A multilayer capacitor according to claim 4, wherein the capacitor element body is formed like a substantially rectangular parallelepiped and has first and second side faces opposing each other and extending transversely of the capacitor element body and third and fourth side faces opposing each other and extending longitudinally of the capacitor element body as the outer surface,
wherein the first signal terminal electrode is arranged on the first side face;
wherein the second signal terminal electrode is arranged on the second side face;
wherein the first ground terminal electrode is arranged on the third side face; and
wherein the second ground terminal electrode is arranged on the fourth side face.

* * * * *